US012572195B2

(12) United States Patent
Lee et al.

(10) Patent No.: US 12,572,195 B2
(45) Date of Patent: Mar. 10, 2026

(54) SYSTEM ON CHIP AND METHOD OF OPERATING THE SAME

(71) Applicant: SAMSUNG ELECTRONICS CO., LTD., Suwon-si (KR)

(72) Inventors: Iksu Lee, Suwon-si (KR); Jungyu Go, Suwon-si (KR); Seki Kim, Suwon-si (KR); Yooseok Shon, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 105 days.

(21) Appl. No.: 18/397,269

(22) Filed: Dec. 27, 2023

(65) Prior Publication Data

US 2024/0377878 A1    Nov. 14, 2024

(30) Foreign Application Priority Data

May 12, 2023    (KR) ........................ 10-2023-0061880

(51) Int. Cl.
| *G06F 1/26* | (2006.01) |
| *G06F 1/20* | (2006.01) |
| *G06F 1/32* | (2019.01) |
| *G06F 1/3296* | (2019.01) |
| *G06F 15/78* | (2006.01) |

(52) U.S. Cl.
CPC ............ *G06F 1/3296* (2013.01); *G06F 1/206* (2013.01); *G06F 15/7807* (2013.01)

(58) Field of Classification Search
CPC ..... G06F 1/3296; G06F 1/206; G06F 15/7807
See application file for complete search history.

(56) References Cited

U.S. PATENT DOCUMENTS

| | | | |
|---|---|---|---|
| 6,922,098 B2 | 7/2005 | Choi et al. | |
| 7,464,277 B2 | 12/2008 | Prosperi et al. | |
| 9,043,620 B2 | 5/2015 | Wang et al. | |
| 9,285,814 B1* | 3/2016 | Agarwal ................. | G05F 1/575 |
| 9,426,748 B2 | 8/2016 | Taha et al. | |
| 10,303,200 B2 | 5/2019 | John et al. | |
| 11,474,584 B2* | 10/2022 | Nishiyama .............. | G06F 1/324 |
| 2010/0017587 A1* | 1/2010 | Wiginton .............. | G06F 21/572 |
| | | | 713/1 |
| 2010/0194442 A1* | 8/2010 | Walley ............... | H03K 19/0008 |
| | | | 327/100 |
| 2015/0177823 A1* | 6/2015 | Maiyuran ............. | G06F 1/3243 |
| | | | 713/320 |
| 2016/0268892 A1* | 9/2016 | Gupta .................... | H02M 3/07 |
| 2016/0342167 A1 | 11/2016 | Zhou et al. | |
| 2018/0032124 A1 | 2/2018 | Fukouka | |
| 2018/0060085 A1* | 3/2018 | Ananthakrishnan ...... | G06F 1/28 |

(Continued)

*Primary Examiner* — Mohammed H Rehman

(74) *Attorney, Agent, or Firm* — Morgan, Lewis & Bockius LLP

(57)    ABSTRACT

A system-on-chip (SoC) includes a processor connected to a plurality of switches that are configured to adjust a supply voltage to the processor, a regulator configured to apply a control signal for controlling at least one of the plurality of switches, and a voltage droop detector connected to the regulator and the processor and configured to transmit a voltage droop detection signal to the regulator when a voltage droop is detected from the processor. The regulator may turn on a predetermined number of switches, among the plurality of switches, based on the control signal when receiving the voltage droop detection signal.

18 Claims, 6 Drawing Sheets

(56) References Cited

U.S. PATENT DOCUMENTS

| | | | |
|---|---|---|---|
| 2019/0265769 A1* | 8/2019 | Gelman | H03K 5/01 |
| 2020/0304112 A1* | 9/2020 | Zhang | H02H 1/0007 |
| 2022/0253117 A1 | 8/2022 | Lee et al. | |

* cited by examiner

Detect voltage droop — S1110

Transmit droop detect signal — S1120

Exit retention state — S1130

2

SYSTEM ON CHIP AND METHOD OF OPERATING THE SAME

CROSS-REFERENCE

This U.S. non-provisional application claims priority under 35 USC § 119 to Korean Patent Application No. 10-2023-0061880, filed on May 12, 2023, in the Korean Intellectual Property Office, the disclosure of which is incorporated by reference in its entirety.

FIELD

The present disclosure relates to a system on a chip or system-on-chip (SoC), and a method of operating the same.

DISCUSSION

In a system-on-chip (SoC), processor area may be increased to optimize performance of the SoC. Leakage power may increase due to process refinement and/or an increase in operating frequency.

SUMMARY

Embodiments of the present disclosure may provide a system-on-chip (SoC) for reducing leakage current, and/or a method of operating the same.

According to an embodiment, a SoC includes a processor connected to a plurality of switches that are configured to adjust a supply voltage to the processor, a regulator configured to apply a control signal for controlling at least one of the plurality of switches, and a voltage droop detector connected to the regulator and the processor and configured to transmit a voltage droop detection signal to the regulator when a voltage droop is detected from the processor. The regulator may turn on a predetermined number of switches, among the plurality of switches, based on the control signal when receiving the voltage droop detection signal.

According to an embodiment, a SoC includes a processor connected to a plurality of switches that are configured to adjust a supply voltage to the processor, a temperature measurement module configured to sense temperature data from the processor, a regulator configured to apply a control signal for controlling at least one of the plurality of switches, and a controller configured to control the regulator so the processor enters a retention state for data retention based on the supply voltage when a first condition associated with the temperature data is satisfied, and to control the regulator so the processor exits the retention state when a second condition associated with the control signal is satisfied.

According to an embodiment, a method of operating a SoC includes sensing temperature data of a processor included in the SoC, entering a retention state for data retention based on a supply voltage of the processor when a first condition associated with the temperature data is satisfied, and exiting the retention state when a second condition associated with a plurality of switches configured to adjust the supply voltage is satisfied.

BRIEF DESCRIPTION OF THE DRAWINGS

The above and other embodiments of the present disclosure will be more clearly understood by way of example from the following detailed description when taken in conjunction with the accompanying drawings, in which.

DETAILED DESCRIPTION

Hereinafter, illustrative embodiments will be described by way of example with reference to the accompanying drawings.

Figure 1:
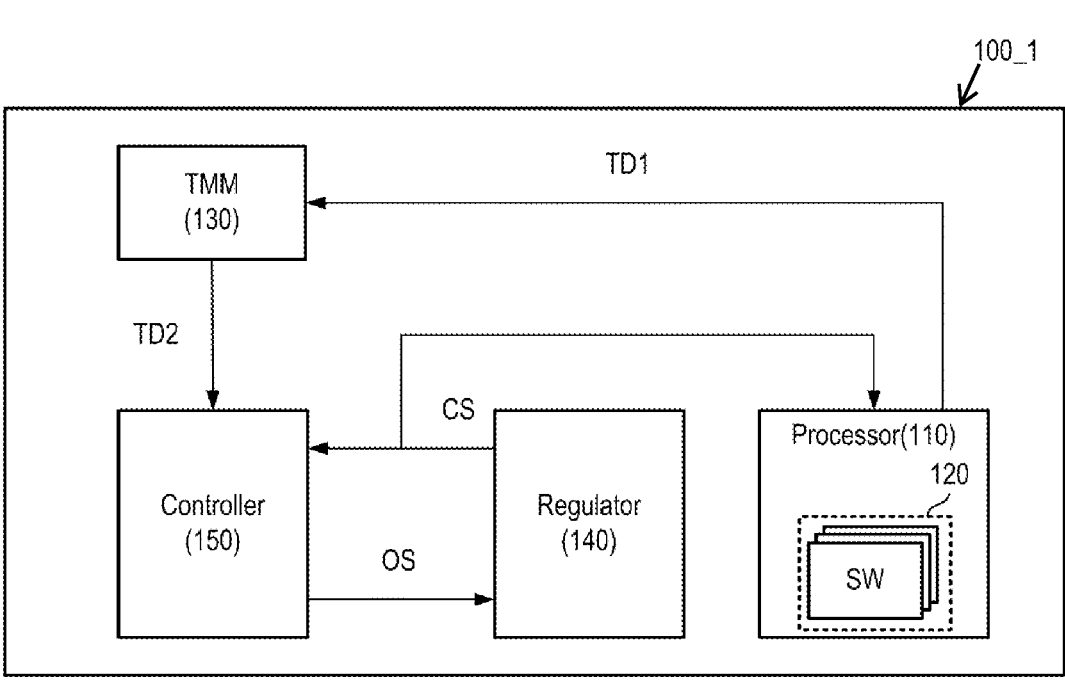
FIG. 1 is a block diagram illustrating a system-on-chip (SoC) according to an illustrative embodiment.

FIG. 1 shows a system-on-chip (SoC) according to an illustrative embodiment.

Referring to FIG. 1, a SoC 100_1 may be implemented as, for example, an integrated circuit (IC), a motherboard, an application processor (AP), a mobile AP, a mobile SoC, or the like.

As an example, the SoC 100_1 may include a processor 110, a temperature measurement module (TMM) 130, a regulator 140 such as but not limited to a low-dropout (LDO) regulator, and a controller 150.

The processor 110 may execute programs stored in the SoC 100_1. Alternatively, the processor 110 may process data stored in the SoC 100_1, externally provided data, or the like. For example, the processor 110 may execute programs and process data in response to clock signals provided internally and/or externally.

In an embodiment, the processor 110 may be implemented as a general-purpose processor, a specific-purpose processor, or an application processor (AP). For example, the processor 110 may be implemented as an operation processor such as a central processing unit (CPU), a graphics processing unit (GPU), an application processor (AP), or the like. The processor may include a specific-purpose logic circuit such as a field programmable gate array (FPGA), an application specific integrated circuit (ASIC), or the like, but embodiments are not limited thereto.

In an embodiment, the processor 110 may be connected to a plurality of switches 120 configured to adjust supply voltages. The plurality of switches 120 may be integrated with the processor, without limitation thereto. The plurality of switches 120 may be controlled by signaling the regulator 140. Each of the plurality of switches 120 is turned on or off in response to the control signal CS, so that a supply voltage supplied from a power rail to the processor 110 may be adjusted. According to various embodiments, the plurality of switches 120 may be included inside the processor 110 to be connected to the processor 110, as illustrated in FIG. 1.

Alternatively, the plurality of switches 120 may be provided outside the processor 110 to be connected to the processor 110.

The temperature measurement module 130 may be configured to sense first temperature data TD1 from the processor 110. For example, the temperature measurement module 130 may periodically or non-periodically sense a temperature value of the processor 110 and may transmit second temperature data TD2, indicating the sensed temperature value, to the controller 150.

The regulator 140 may be configured to control the supply voltage supplied to processor 110. The regulator 140 may apply a control signal CS, to the processor 110 and to the controller 150, for controlling at least one of the plurality of switches 120 connected to the processor 110.

The control signal CS may be variously configured or set to turn on or off each of the plurality of switches 120. For example, the control signal CS may include a plurality of bits, and each of the bits may correspond to at least one switch. Each of the plurality of switches 120 may be turned on or off and a supply voltage supplied to the processor 110 may be adjusted, depending on a logic state such as a logical high state or a logical low state of the control signal CS.

The regulator 140 may be implemented as a linear regulator, such as a low dropout (LDO) regulator, a switching regulator, or the like. For example, the regulator 140 may be implemented as a digital LDO (DLDO) regulator implemented as a digital controller having a comparator, a shift register, or the like.

The controller 150 may control the overall operation of the SoC 100_1. As an example, the controller 150 may control entering or exiting a retention state of the processor 110.

The retention state may be defined as a state for a low-power operation of the SoC 100_1. For example, the retention state may be defined as a state when the processor 110 operates in a clock-gating state. In the clock-gating state, supply of a clock signal to the processor 110 may cease. In the clock-gating state, the processor 110 may be supplied with a supply voltage of a certain level. The retention state may refer to a state in which the processor 110 is supplied with a minimum supply voltage for storing or retaining data.

For example, in the retention state, the controller 150 may supply a minimum voltage for the processor 110 to store data by signaling the regulator 140. The processor 110 may be supplied with a minimum voltage at which an element for data storage, such as a logic element or a flip-flop, is operable under the control of the controller 150. Accordingly, the processor 110 may operate at low power in the retention state.

The controller 150 may control the regulator 140 through an operating signal OS.

In an embodiment, when a first condition associated with the temperature data TD1 and/or TD2 is satisfied, the controller 150 may control the regulator 140 so the processor 110 enters the retention state. For example, the first condition may be defined as whether the temperature data TD1 and/or TD2 satisfies a predetermined temperature value or less. For example, the first condition may be satisfied when the temperature data TD1 and/or TD2 is less than or equal to the predetermined temperature value, and need not be satisfied when the temperature data TD1 and/or TD2 is greater than the predetermined temperature value.

To satisfy the first condition may mean that a temperature of the processor 110 is within an appropriate temperature range. Since power is being supplied even when the processor 110 operates in a clock-gating state, leakage current may be present. When the operating temperature of the processor 110 increases, the amount of leakage current may increase accordingly. An increase in the amount of leakage current may affect the operation of the regulator 140, connected to the processor 110, to adjust the voltage of the processor 110. Accordingly, the controller 150, according to an embodiment, may check the first condition before entering the retention state, and may then control the processor 110 to enter the retention state if the temperature is one at which the regulator 140 is operable.

The controller 150 may compare the temperature data TD2, received from the temperature measurement module 130, with the predetermined temperature value and may determine whether the first condition is satisfied. The controller 150 may determine whether a first condition is satisfied before entering the retention state. When the first condition is satisfied, the controller 150 may control the regulator 140 so the processor 110 enters the retention state.

The controller 150 and the regulator 140 may operate to match a voltage used in the retention state. Such voltage used in the retention state may be referred to as a "retention voltage". For example, when the supply voltage supplied to the processor 110 is decreased, the controller 150 may turn on at least one of the plurality of switches 120 by signaling the regulator 140. For example, the controller 150 may apply an operating signal OS including a command for turning on at least one switch to the regulator 140. The regulator 140 may apply a control signal CS, corresponding to a difference between the supply voltage and the retention voltage, to the plurality of switches 120. The at least one switch is turned on, so that the supply voltage to the processor may be increased.

For example, when the supply voltage supplied to the processor 110 is increased, the controller 150 may turn off at least one of the plurality of switches 120 by signaling the regulator 140. For example, the controller 150 may apply an operating signal OS, including a command for turning off at least one switch, to the regulator 140. The regulator 140 may apply a control signal CS, corresponding to a difference between the supply voltage and the retention voltage, to the plurality of switches 120. The at least one switch is turned off so that the supply voltage may be decreased.

The number of the at least one switch turned on or off, and/or or voltage increment(s) thereof, may be determined depending on a difference between the supply voltage and the retention voltage.

When the first condition is not satisfied, such as when the temperature of the processor 110 is high, the amount of leakage current may be large, which may exceed current at which the regulator 140 is controllable or operable. Accordingly, the controller 150 may suspend entry into the retention state.

The controller 150 and the regulator 140 may substantially continuously or periodically operate to match the retention voltage even after entering the retention state.

For example, when the temperature TD1 of the processor 110 is increased, leakage current of the processor 110 may be increased. Accordingly, the controller 150 and the regulator 140 may turn on at least one switch based on the control signal CS to maintain the retention voltage. Since the supply voltage is increased as at least one switch is turned on, the retention voltage may be maintained even when the temperature is increased.

In an embodiment, when a second condition associated with a control signal CS is satisfied, the controller 150 may control the regulator 140 in such a manner that the processor 110 exits the retention state. For example, the second condition may be defined as whether the number of at least one switch whose turn-on is instructed by the control signal CS satisfies a predetermined number N1 or more, where N1 is a positive integer.

In an embodiment, the controller 150 may be configured to receive the control signal CS from the regulator 140. The control signal CS may indicate how many switches of the plurality of switches 120 are turned on or off. Hence, the controller 150 may identify a turn-on or turn-off state for each of the plurality of switches 120 based on the control signal CS received from the regulator 140. The controller 150 may determine whether the second condition is satisfied based on the control signal CS.

When the second condition is satisfied, the controller 150 may control the processor 110 such as to exit the retention state by signaling the regulator 140. The controller 150 may apply an operating signal OS to the regulator 140, and the regulator 140 may turn on a predetermined number N2 of switches, where N2 is a positive integer, among the plurality of switches 120, based on the control signal CS. The predetermined number N2 may be set as the number of all switches in a currently turned-off state or some switches, among the plurality of switches 120. For example, the predetermined number N2 may be set as the number of switches sufficiently exceeding a retention voltage when N2 switches are turned on.

When the number of switches turned on to maintain the retention voltage is substantially continuously or periodically increased after entering the retention state, leakage current may be increased to exceed leakage current that is capable of being processed by the regulator 140.

Accordingly, the controller 150 may protect the regulator 140 by identifying the control signal CS and controlling the regulator 140 to exit the retention state in advance before exceeding the leakage current that is capable of being processed by the regulator 140.

According to the above-described embodiments, the SoC 100_1 may stably control entering and exiting the retention state for data retention of the processor 110. For example, before entering the retention state, a temperature of the process may be checked in advance to stably enter the retention state. In addition, after entering the retention state, the control signal CS of the regulator 140 that is capable of representing leakage current, may be monitored to exit the retention state in advance before the leakage current is increased.

Figure 2:
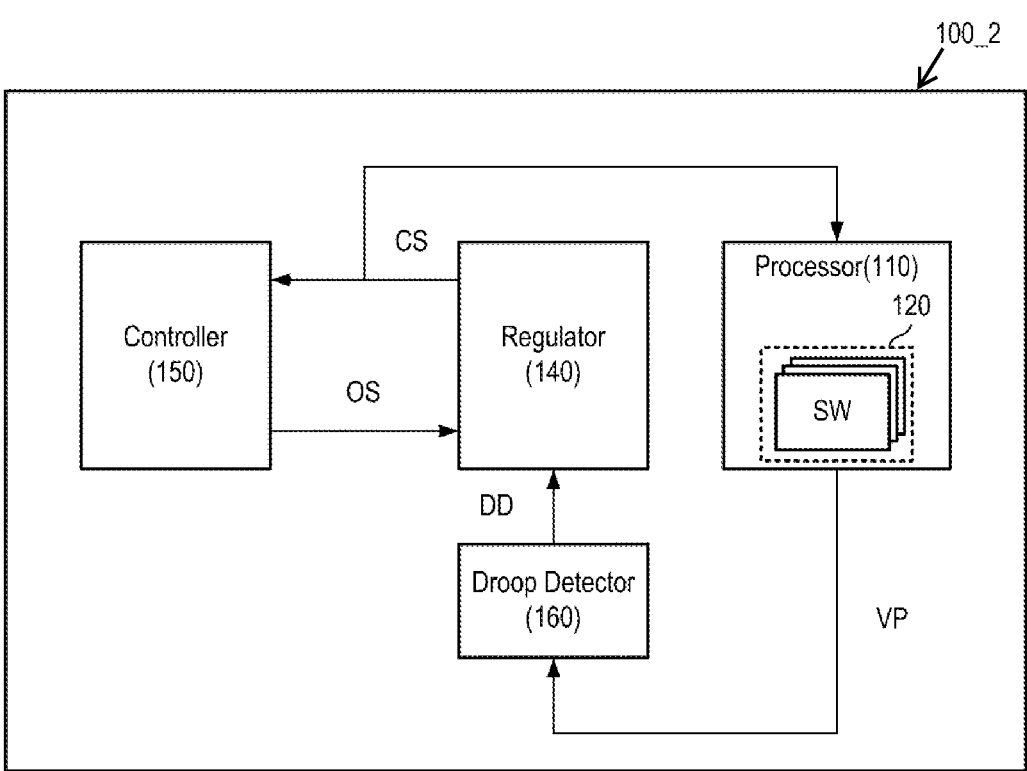
FIG. 2 is a block diagram illustrating a SoC according to an illustrative embodiment.

FIG. 2 shows a SoC according to an illustrative embodiment. Hereinafter, redundant descriptions will be omitted.

Referring to FIG. 2, as an example, a SoC 100_2 may include a processor 110, a regulator 140, a controller 150, and a droop detector 160.

The processor 110 may include a plurality of switches 120, and the regulator 140 may adjust a supply voltage of the processor 110 by controlling the plurality of switches 120 based on an operating signal OS applied from the controller 150. The regulator 140 may be an LDO regulator or a DLDO regulator, without limitation thereto.

The droop detector 160 may be connected to the regulator 140 and the processor 110, and may detect a voltage droop from the processor 110. The voltage droop may be defined as a phenomenon in which a supply voltage VP of the processor 110 or another processing circuit significantly drops while fluctuating depending on an operation environment and a level of an operation to be performed. The other processing circuit may be a functional circuit, a semiconductor circuit, or the like. For example, the droop detector 160 may monitor the supply voltage VP through a power rail to which the supply voltage VP is supplied. The droop detector 160 may transmit a voltage droop detection signal to the regulator 140 when a voltage droop is detected. For example, the droop detector 160 may generate and transmit a droop detection signal to the regulator 140 when the supply voltage VP drops to a predetermined voltage level or less.

In an embodiment, the voltage droop detector 160 may be configured to transmit a voltage droop detection signal to the regulator 140 within a predetermined time. For example, the voltage droop detector 160 may be connected to and physically adjacent to the regulator 140. Accordingly, when a voltage droop is detected, the voltage droop detector 160 may rapidly transmit a droop detection signal to the regulator 140.

The regulator 140 is connected to the droop detector 160, and thus may directly receive the droop detection signal from the droop detector 160. When receiving the voltage droop detection signal, the regulator 140 may control the processor 110 to exit the retention state. In an embodiment, the regulator 140 may turn on a predetermined number N2 of switches, among the plurality of switches 120, based on the control signal CS. As the N2 switches are turned on, the supply voltage VP of the processor 110 may be increased. The processor 110 may exit the retention state as the N2 switches are turned on.

According to the above-described embodiment, the SoC 100_2 may exit the retention state when a droop is detected by the droop detector 160 directly connected to the regulator 140. The regulator 140 may control the plurality of switches 120 to exit the retention state when directly receiving the droop detection signal from the droop detector 160. Thus, data loss of the processor 110 may be prevented when the retention state is unstable due to the droop.

Figure 3:
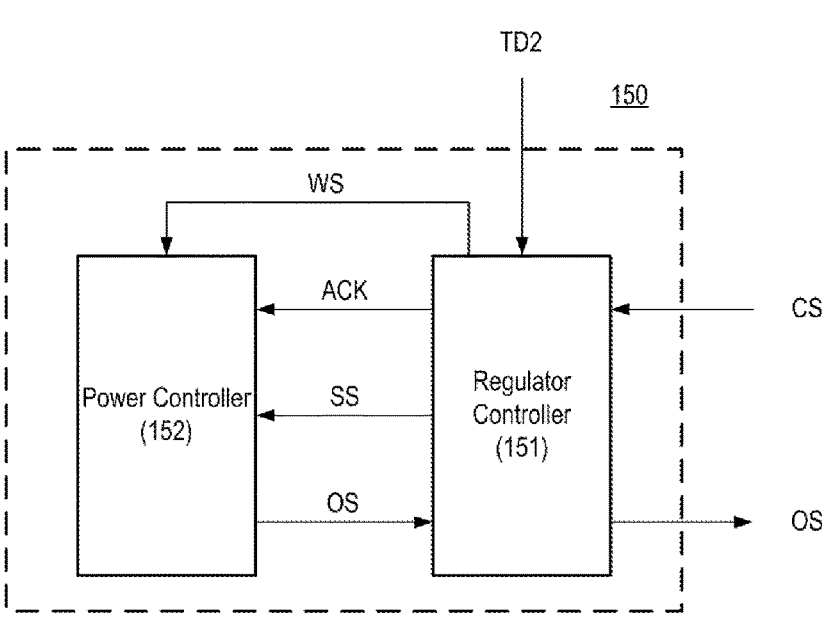
FIG. 3 is a block diagram illustrating a controller according to an illustrative embodiment.

FIG. 3 shows a controller according to an illustrative embodiment.

Referring to FIG. 3, a controller 150 according to an embodiment may include a regulator controller 151 and a power controller 152.

The regulator controller 151 may control the overall operation of the regulator 140 under the control of the power controller 152.

According to various embodiments, the regulator controller 151 may receive temperature data TD2 from the temperature measurement module 130 of FIG. 1, receive a control signal CS from the regulator 140, or output an operating signal OS for controlling the regulator 140 to the regulator 140.

The regulator controller 151 may monitor a temperature of the processor 110 based on the received temperature data TD. For example, the regulator controller 151 may compare the temperature data TD2 with a predetermined temperature value, and may determine whether a first condition is satisfied. When the first condition is satisfied, the regulator controller 151 may output an acknowledgment signal ACK to the power controller 152 before entering the retention state.

The power controller 152 may control overall operations of the regulator controller 151.

In an embodiment, the power controller may determine that it can enter the retention state when receiving an acknowledgment signal ACK. The power controller 152 may transmit an operating signal OS, corresponding to the acknowledge signal ACK, to the regulator controller 151.

The regulator controller 151 may control the regulator 140 based on the operating signal OS received from the power controller 152. For example, the operating signal OS may be provided to generate a control signal CS controlling at least one of the plurality of switches 120 to be turned on or off to enter the retention state.

In an embodiment, the regulator controller 151 may receive the control signal CS from the regulator 140 and may monitor the received control signal CS. The regulator controller 151 may determine whether above-described second condition is satisfied, based on the control signal CS. When the second condition is satisfied, for example, when the number of at least one switch, instructing turn-on by the control signal CS, is larger than or equal to N1, the regulator controller 151 outputs a stop signal SS to the power controller 152.

The power controller 152 may output an operating signal OS, corresponding to the stop signal SS, to the regulator controller 151. The regulator controller 151 may control the regulator 140 based on the operating signal OS, allowing the processor 110 to exit the retention state.

In an embodiment, the regulator controller 151 outputs a warning signal WS to the power controller 152 when the second condition is highly likely to be satisfied, for example, when the number of turned-on switches is at least one and approaches N1.

Figure 4:
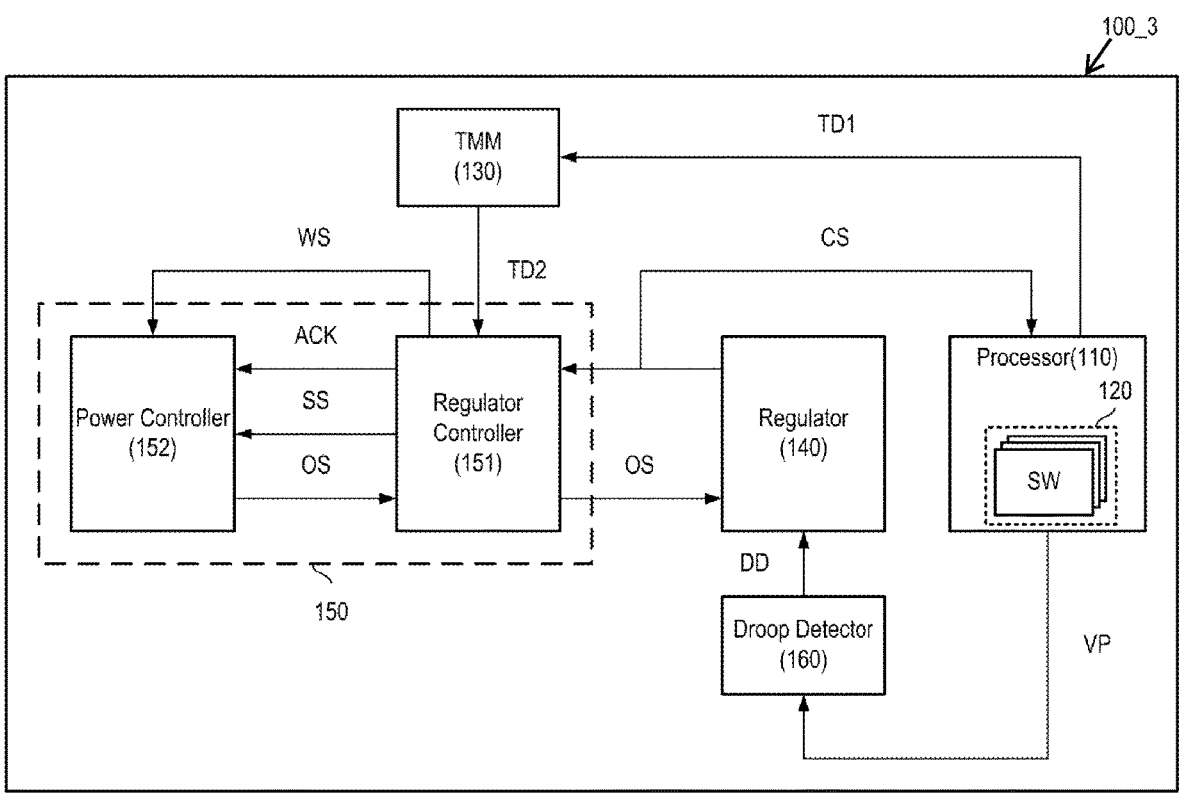
FIG. 4 is a block diagram illustrating a SoC according to an illustrative embodiment.

FIG. 4 shows a SoC according to an illustrative embodiment.

Referring to FIG. 4, as an example, a SoC 100_3 may include a processor 110, a temperature measurement module 130, a regulator 140, a regulator controller 151, a power controller 152, and a droop detector 160.

In an embodiment, before entering the retention state, the temperature measurement module 130 may sense a temperature of the processor 110 to transmit temperature data TD2 to the regulator controller 151. The regulator controller 151 may determine whether a first condition is satisfied, based on the temperature data TD2, and may transmit an acknowledgment signal ACK to the power controller 152 when the first condition is satisfied. The power controller 152 may transmit an operating signal OS for entering the retention state to the regulator 140 by signaling the regulator controller 151. The regulator 140 may turn on or off the plurality of switches 120 based on the control signal CS for entering the retention state.

In an embodiment, after entering the retention state, the regulator controller 151 may receive the control signal CS of the regulator 140. The regulator controller 151 may determine whether the second condition is satisfied, based on the received control signal CS, and may transmit a stop signal SS to the power controller 152 when the second condition is satisfied. Alternatively, the regulator controller 151 may transmit the warning signal WS to the power controller 152 in advance before the second condition is satisfied. The power controller 152 may transmit the operating signal OS, corresponding to the stop signal SS, to the regulator 140 by signaling the regulator controller 151. The regulator 140 may turn on N2 switches based on the control signal CS for exiting the retention state.

In an embodiment, the droop detector 160 may substantially continuously or periodically detect a voltage droop from the processor 110. For example, the droop detector 160 may detect a voltage droop from the supply voltage VP of the processor 110 step by step or sequentially, without limitation thereto. The droop detector 160 may first detect a first threshold voltage from the processor 110. For example, the first threshold voltage may be defined as a voltage for warning the regulator 140 of a potential occurrence of a voltage droop before an actual occurrence of the voltage droop. The droop detector 160 may detect that a voltage droop has occurred when the supply voltage VP of the processor 110 reaches a second threshold voltage after crossing a first threshold voltage. For example, the second threshold voltage may have a value that may be defined as occurrence of a voltage droop in the processor 110.

When the voltage droop is detected, the droop detector 160 may transmit a droop detection signal to the regulator 140. When receiving the droop detection signal, the regulator 140 may control the processor 110 to exit the retention state.

Figure 5:
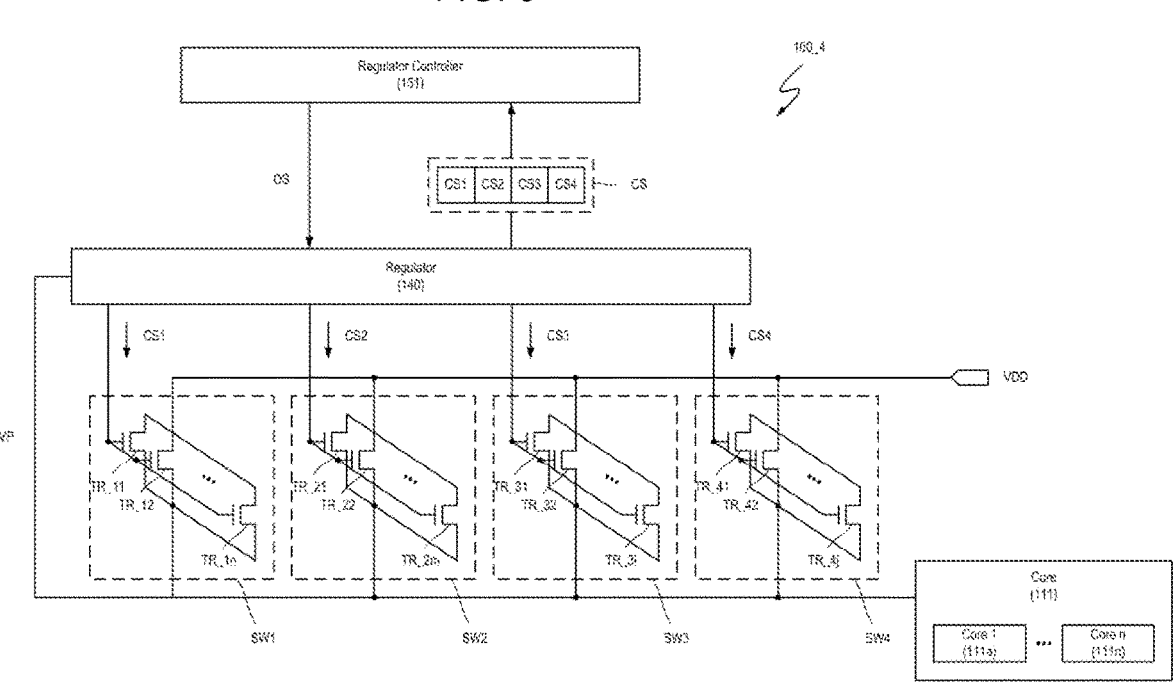
FIG. 5 is a hybrid diagram illustrating a SoC in a retention exiting event according to an illustrative embodiment.

FIG. 5 shows a SoC in a retention exiting event according to an illustrative embodiment.

Referring to FIG. 5, in an embodiment, a regulator 140 included in a SoC 100_4 may be connected to first to fourth switch circuits SW1 to SW4. The first to fourth switch circuits SW1 to SW4 may correspond to the plurality of switches 120 described above.

The first to fourth switch circuits SW1 to SW4 may be connected to the regulator 140 and a processor core 111 that may be included in the processor 110 of FIG. 1, 2 or 4. As an example, the core 111 may include a single core or may be defined as a cluster including a plurality of sub-cores 111a to 111n. Each of the plurality of sub-cores may be implemented as an independently drivable processor core. Each of the plurality of sub-cores 111a to 111n may independently read and execute program instructions.

The first switch circuit SW1 may include n transistors TR_11 to TR_1n, the second switch circuit SW2 may include m transistors TR_21 to TR_2m, the third switch circuit SW3 may include i transistors TR_31 to TR_3i, and the fourth switch circuit SW4 may include j transistors TR_41 to TR_4j, where m, n, i, and j are positive integers that may be the same and/or different from each other.

The regulator 140 may control the first switch circuit SW1 based on a first control signal CS1, control the second switch circuit SW2 based on a second control signal CS2, control the third switch circuit SW3 based on a third control signal CS3, and control the fourth switch circuit SW4 based on a fourth control signal CS4. The first control signal CS1 may turn on or off at least one of the n transistors TR_11 to TR_1n, the second control signal CS2 may turn on or off at least one of the m transistors TR_21 to TR_2m, the third control signal CS3 may turn on or off at least one of the i transistors TR_31 to TR_3i, and the fourth control signal CS4 may turn on or off at least one of the j transistors TR_41 to TR_4j. As each transistor is turned on or off, a supply voltage VP applied from an external supply voltage VDD to the core 111 may be adjusted.

The regulator 140 may transmit a single control signal CS, including the first control signal CS1 through the fourth control signal CS4, to the regulator controller 151. For example, each control signal may have either one of a logical low level and/or a logical high level. It will be appreciated that each control signal may have as many bits as the number of corresponding transistors, or may be variously configured to control other transistors.

The regulator controller 151 may monitor a single control signal CS to identify how many transistors are turned on or off to adjust a supply voltage. For example, a logical low level may be set to instruct turn-on of a transistor. In this case, when a single control signal CS has a logical value of "0011," the first switch circuit SW1 and the second switch circuit SW2 may be turned on and the third switch circuit SW3 and the fourth switch circuit SW4 may be turned off. The regulator controller 151 may identify the control signal CS to determine that at least one or more of the m transistors and at least one or more of the n transistors are currently turned on.

The regulator controller 151 may determine whether the second condition is satisfied, based on the number of transistors indicated through the control signal CS. When the second condition is satisfied, the regulator controller 151 may transmit an operating signal OS, instructing data retention, to the regulator 140.

Figure 6:
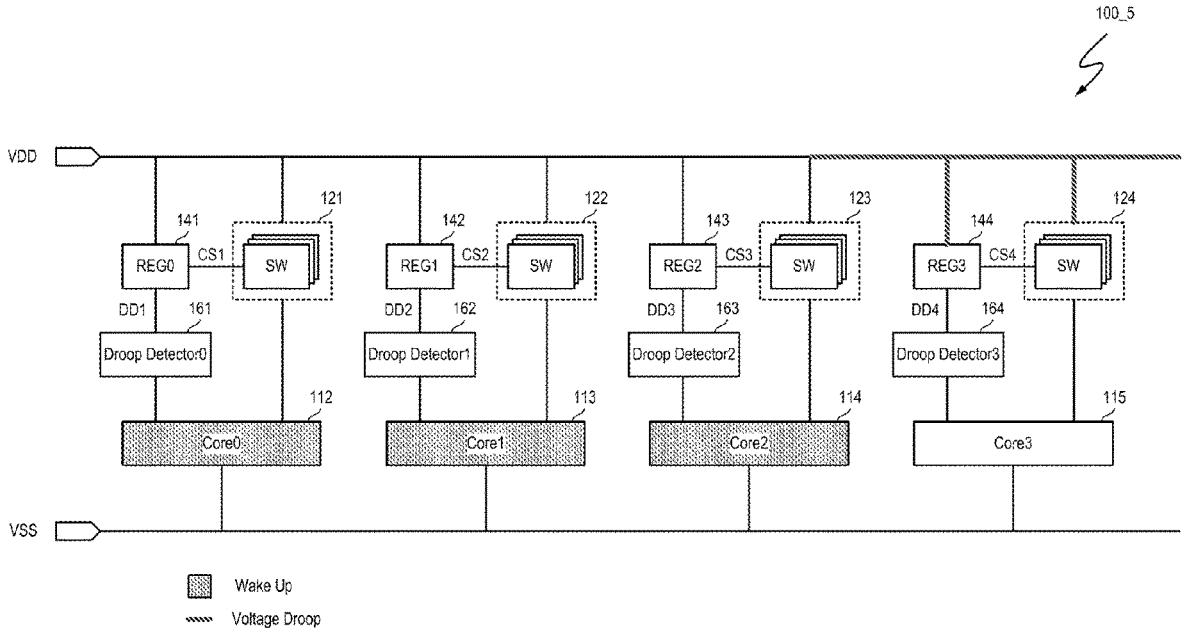
FIG. 6 is a hybrid diagram illustrating a SoC in a voltage droop event according to an illustrative embodiment.

FIG. 6 shows a SoC in a voltage droop event according to an illustrative embodiment.

Referring to FIG. 6, a SoC 100_5 may include first to fourth regulators 141 to 144, first to fourth switch groups 121 to 124, first to fourth cores 112 to 115, and first to fourth droop detectors 161 to 164. The first to fourth regulators 141 to 144 may be connected to a power rail to which an external supply voltage VDD is supplied. Each of the first to fourth regulators 141 to 144 may be connected to each of the first to fourth switch groups 121 to 124 to control a connected switch group. Moreover, each of the first to fourth regulators 141 to 144 may be LDO regulators and/or DLDO regulators, without limitation thereto.

Each of the first to fourth switch groups 121 to 124 may include a plurality of switches SW. The plurality of switches 120 may be turned on or off based on a control signal CS of each regulator 140. The control signal CS may be analog or digital for each regulator if the regulator is LDO or DLDO, respectively.

The first to fourth cores 112 to 115 may be connected to a power rail to which a ground voltage VSS is applied. Such a power rail may also be referred to as a "virtual power rail". The first to fourth cores 112 to 115 may be included in the processor 110 of FIGS. 1, 2, and 4 described above. Each of the first to fourth cores 112 to 115 may independently read and execute program instructions.

At least one or more of the first to fourth cores 112 to 115 may be in a wake-up state. For example, as illustrated in the drawing, the first to third cores 112 to 114 may be in a wake-up state for a specific operation. In this case, more supply voltages may be supplied from the power rail for power in the wake-up state. For example, load currents for the first to third cores 112 to 114 may be increased. Thus, the supply voltage of the power rail may swing widely. According to the swing, a voltage droop may occur in the supply voltage to the fourth core 114.

The first to fourth droop detectors 161 to 164 may be connected to the first to fourth regulators 141 to 144 and the first to fourth cores 112 to 115, respectively. The first to fourth droop detectors 161 to 164 may detect a voltage droop occurring in at least one core, and may output first to fourth droop detection signals DD1 to DD4 to the first to fourth droop detectors 141 to 144.

Figures 7, 8:
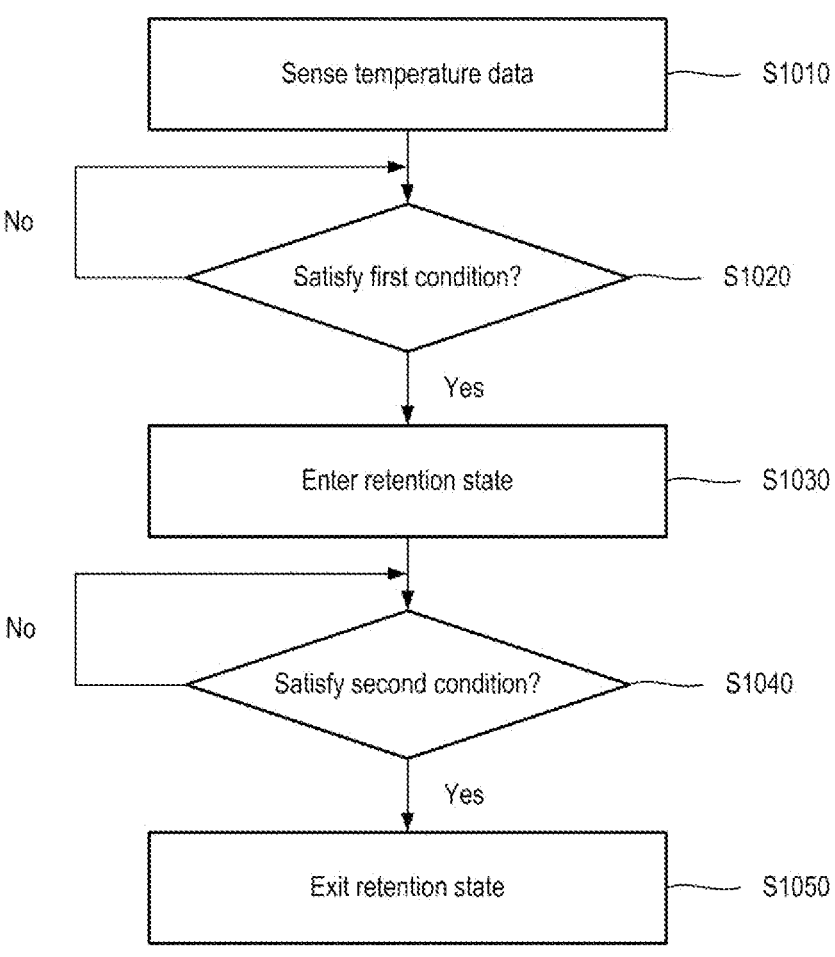
FIG. 7 is a flowchart diagram illustrating a method of operating a SoC according to an illustrative embodiment.
FIG. 8 is a flowchart diagram illustrating a method of exiting a retention state according to an illustrative embodiment.

FIG. 7 shows a method of operating a SoC according to an illustrative embodiment.

Referring to FIG. 7, in an embodiment, in operation S1010, the systems on a chip 100_1 to 100_5 may sense the temperature data TD1 of the processor 110.

In operation S1020, the systems on chips 100_1 to 100_5 may determine whether a first condition associated with the temperature data TD1 and/or TD2 is satisfied.

When the first condition is satisfied, the flow proceeds to operation S1030 in which the systems on chips 100_1 to 100_5 may enter a retention state for data retention based on a supply voltage. For example, the SoC 100_1 to 100_5 may perform an operation of generating or transmitting an acknowledgment signal ACK, an operating signal OS, and a control signal CS to enter the retention state. When the first condition is not satisfied, the SoC 100_1 to 100_5 may suspend entry into the retention state.

In operation S1040, the SoC 100_1 to 100_5 may determine whether a second condition associated with the plurality of switches 120, configured to adjust the supply voltage after entering the retention state, is satisfied.

When the second condition is satisfied, the flow proceeds to operation S1050 in which the systems on chips 100_1 to 100_5 may exit the retention state. For example, the SoC 100_1 to 100_5 may perform an operation of generating or transmitting a warning signal WS, a stop signal SS, an operating signal OS, and a control signal CS to exit the retention state. When the second condition is not satisfied, the systems on chips 100_1 to 100_5 may be maintained in the retention state.

FIG. 8 shows a method for exiting a retention state according to an illustrative embodiment.

Referring to FIG. 8, in an embodiment, in operation S1110, the droop detector 160 may detect a voltage droop from the processor 110. For example, the SoC may monitor whether a supply voltage drops to a predetermined voltage level or less. When the supply voltage drops to the predetermined level or less, the SoC may determine that a voltage droop is detected. For example, the droop detector 160 may detect a voltage droop from a voltage VP of the processor 110 step by step or sequentially. The droop detector 160 may first detect a first threshold voltage from the processor 110. For example, the first threshold voltage may be defined as a voltage for warning the regulator 140 of occurrence of a smaller voltage drop before the larger voltage droop occurs. The droop detector 160 may detect that a voltage droop has occurred when the voltage VP of the processor 110 reaches a second threshold voltage after crossing the first threshold voltage. For example, the second threshold voltage may have a value that may be defined as an occurrence of a voltage droop in the processor 110.

When the voltage droop is detected, the flow proceeds to operation S1120 in which the droop detector 160 may transmit a droop detection signal to the regulator 140.

In operation S1130, the regulator 140 may control the processor 110 to exit the retention state through the plurality of switches 120 included in the processor 110 when receiving the droop detection signal. For example, the regulator may control the processor to exit the retention state substantially immediately upon receiving the droop detection signal.

Figure 9:
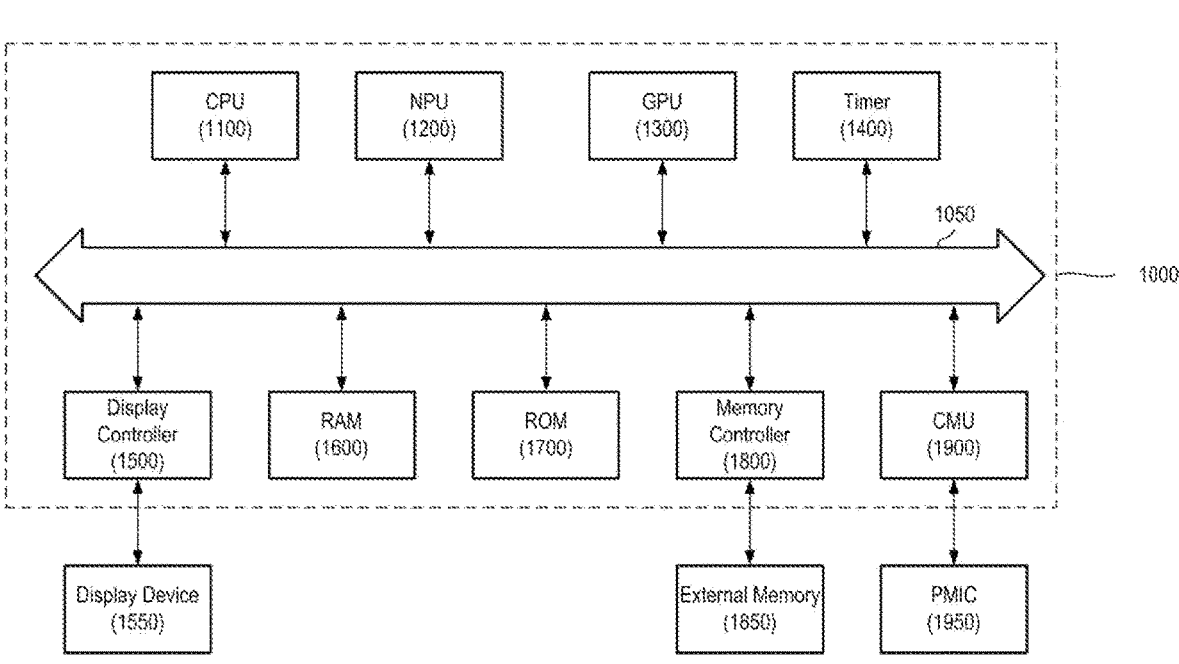
FIG. 9 is a block diagram illustrating an electronic device according to an illustrative embodiment.

FIG. 9 shows an electronic device in an illustrative embodiment.

Referring to FIG. 9, in an embodiment, an electronic device 1 may be implemented as a handheld device such as a mobile phone, a smartphone, a tablet personal computer (PC), a personal digital assistant (PDA), an enterprise digital assistant (EDA), and a digital still camera, a digital video camera, a portable multimedia player (PMP), a personal navigation device or a portable navigation device (PND), a handheld game console, or an e-book.

In an embodiment, the electronic device 1 may include a SoC 1000, an external memory 1850, a display device 1550, and a power management integrated circuit (PMIC) 1950.

In an embodiment, the SoC 1000 may include a central processing unit (CPU) 1100, a neural network processing unit (NPU) 1200, a graphics processing unit (GPU) 1300, a timer 1400, a display controller 1500, a random access memory (RAM) 1600, a read-only memory (ROM) 1700, a memory controller 1800, a clock management unit (CMU)

1900, and bus 1050. The SoC 1000 may further include other components other than the components illustrated in the drawing.

In an embodiment, the SoC 1000 may be implemented according to the above-described embodiments. The SoC 1000 may sense the temperature data TD1 of the processor 110 to determine whether a first condition is satisfied, and may enter a retention state when the first condition is satisfied. In addition, the SoC 1000 may monitor a control signal CS to determine whether the second condition is satisfied, and may exit the retention state when the second condition is satisfied. In addition, the SoC 1000 may exit the retention state when a voltage droop is detected.

In an embodiment, the electronic device 1 may further include a display device 1550, an external memory 1850, and a PMIC 1950. In FIG. 9, the PMIC 1950 is implemented outside the SoC 1000. However, according to an embodiment, the SoC 1000 may include a power management unit (PMU) that is capable of performing functions of the PMIC 1950.

The CPU 1100 may be referred to as a processor, and may be connected to or associated with one or more switches configured to adjust a supply voltage. The CPU may process or execute programs and/or data stored in the external memory 1850. For example, the CPU 1100 may process or execute programs and/or data in response to an operation clock signal output from the CMU 1900. The CPU 1100 may be implemented as a multicore processor. A multicore processor may be a single computing component having two or more independent actual processors, which may also be referred to as cores. Each of the cores may read and execute program instructions.

According to the above-described embodiments, when a voltage droop is detected in at least one or more of the cores, the SoC 1000 may operate to exit the retention state.

Programs and/or data stored in the ROM 1700, the RAM 1600, and/or the external memory 1850 may be loaded into a memory, not illustrated, of the CPU 1100, as necessary.

The NPU 1200 may process a large-scale operation using an artificial neural network. For example, the NPU may process such a large-scale operation more efficiently than a corresponding CPU, and/or relieve such a load from the CPU. The NPU 1200 may support multiple simultaneous matrix operations to perform deep learning.

The GPU 1300 may convert data, read from the external memory 1850 by the memory controller 1800, into a signal appropriate for the display device 1550. The GPU may augment the NPU for some operations.

The timer 1400 may output a count value indicating time, such as based on an operation clock signal output from the CMU 1900.

The display device 1550 may display image signals output from the display controller 1500. The display device 1550 may be implemented as, for example, a liquid crystal display (LCD), a light-emitting diode (LED) display, an organic LED (OLED) display, an active-matrix OLED (AMOLED) display, or a flexible display.

The display controller 1500 may control one or more operations of the display device 1550.

The RAM 1600 may temporarily store programs, data, or instructions. For example, the programs and/or data stored in the external memory 1850 may be temporarily stored in the RAM 1600 under the control of the CPU 1100, or based on a booting code stored in the ROM 1700. The RAM 1600 may be implemented as a dynamic RAM (DRAM), a static RAM (SRAM). Moreover, the ROM and/or the RAM may be at least partially implemented in flash memory, such as but not limited to high-speed and/or high-capacity flash memory. More specifically, the ROM and/or the RAM may vertical NAND FLASH memory (V-NAND).

The ROM 1700 may store persistent programs and/or data. The ROM 1700 may also be implemented as an erasable programmable read-only memory (EPROM) or an electrically erasable programmable read-only memory (EE-PROM).

The memory controller 1800 may communicate with the external memory 1850 through an interface. The memory controller 1800 may control the overall operation of the external memory 1850, and may control data to be exchanged between a host and the external memory 1850. For example, the memory controller 1800 may write data to or read data from the external memory 1850 based on a request from the host. The host may be a master device such as the CPU 1100, the GPU 1300, or the display controller 1500. The external memory 1850, which may be a storage medium for storing data such as but not limited to a V-NAND flash memory, may store an operating system (OS), various programs, and/or various types of data. The external memory 1850 may be, for example, a DRAM, but embodiments are not limited thereto. Alternatively, the external memory 1850 may be a nonvolatile memory (NVM) device such as any flash memory, phase change RAM (PRAM), magnetic RAM (MRAM), resistive RAM (RRAM), and/or ferroelectric RAM (FeRAM) device.

In an embodiment, the external memory 1850 may be an internal memory provided inside the SOC 1000. Moreover, the external memory 1850 may be a flash memory, an embedded multimedia card (eMMC), or a universal flash storage (UFS).

The CMU 1900 may generate an operation clock signal. The CMU 1900 may include a clock signal generating device, such as a phase locked loop (PLL), a delayed locked loop (DLL), or a crystal oscillator, without limitation thereto. The operation clock signal may be provided to the GPU 1300. The operation clock signal may also be provided to another component. For example, the operation clock signal may also be provided to the CPU 1100, the memory controller 1800 or the like. The CMU 1900 may change a frequency of the operation clock signal. The CPU 1100, the NPU 1200, the GPU 1300, the timer 1400, the display controller 1500, the RAM 1600, the ROM 1700, the memory controller 1800, and the CMU 1900 may communicate with each other through the bus 1050.

Figure 10:
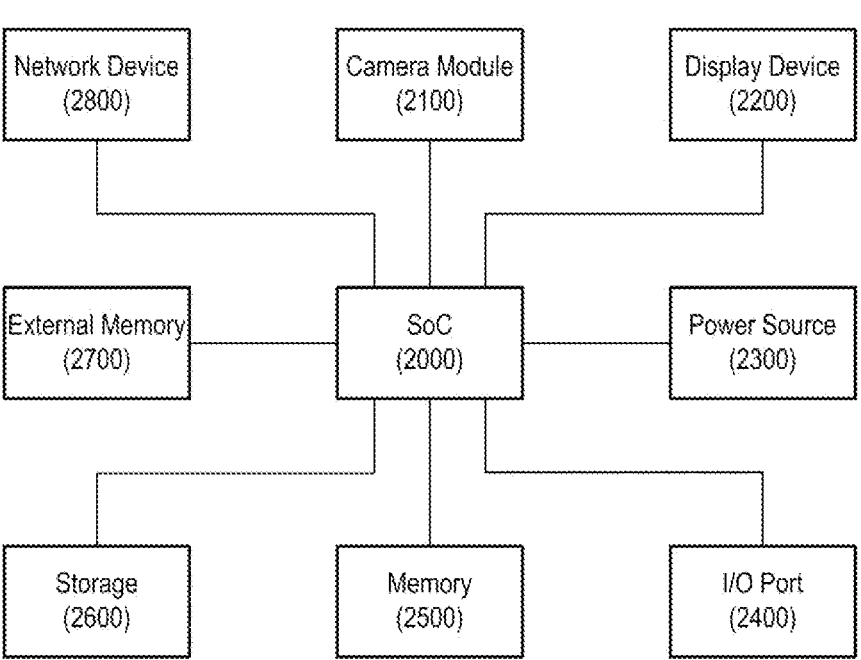
FIG. 10 is a block diagram illustrating an electronic device including a SoC according to an illustrative embodiment.

FIG. 10 shows an electronic device including a SoC according to an illustrative embodiment.

In an embodiment, an electronic device 2 may be implemented as a personal computer (PC), a data server, or a portable electronic device 2. The portable electronic device 2 may be implemented as a handheld device such as a mobile phone, a smartphone, a tablet personal computer (PC), a personal digital assistant (PDA), an enterprise digital assistant (EDA), and a digital still camera, a digital video camera, a portable multimedia player (PMP), a personal navigation device or a portable navigation device (PND), a handheld game console, or an e-book.

In an embodiment, the electronic device 2 may include a SoC 2000, a display 2200, a power source 2300, an input/output port 2400, a memory 2500, a storage 2600, and an external memory 2700, and a network device 2800. According to an embodiment, the electronic device 2 may further include a camera module 2100. The SoC 2000 may be implemented according to the above-described embodiments, and may control entering or exiting a retention state based on temperature data TD, a control signal CS, and a voltage droop.

The camera module 2100 refers to a module that is capable of converting an optical image into an electrical image. Accordingly, an electrical image output from the camera module 2100 may be stored in the storage 2600, the memory 2500, or the external memory 2700. Moreover, the electrical image output from the camera module 2100 may be displayed through the display 2200.

The display 2200 may display data output from the storage 2600, the memory 2500, the input/output port 2400, the external memory 2700, or the network device 2800. For example, the display 2200 may be the display device of FIG. 9.

The power source 2300 may supply an operating voltage to at least one of the components. The power source 2300 may be controlled by the PMIC of FIG. 9.

The input/output port 2400 refers to ports that are capable of transmitting data to the electronic device 2 or transmitting data output from the electronic device 2 to an external device. For example, the input/output port 2400 may be a port for connecting a pointing device such as a computer mouse, a port for connecting a printer, or a port for connecting a USB drive.

The memory 2500 may be implemented as a volatile memory or a nonvolatile memory, and may correspond to the external memory of FIG. 9. For example, a memory controller that is capable of controlling a data access operation to the memory 2500, for example, a read operation, a write operation or a program operation, and/or an erase operation, may be integrated or embedded in the SoC 2000. For example, the memory controller may be implemented between the SoC 2000 and the memory 2500.

The storage 2600 may be implemented as a hard disk drive or a solid-state drive (SSD), without limitation thereto. For example, one or more SSDs may be implemented in V-NAND flash memory.

The external memory 2700 may be implemented as a secure digital (SD) card or a multimedia card (MMC), which may also include flash memory such as V-NAND. For example, the external memory 2700 may be or include a subscriber identification module (SIM) card or a universal subscriber identity module (USIM) card.

The network device 2800 refers to a device that is capable of connecting the electronic device 2 to a wired network or a wireless network.

As set forth above, according to illustrative embodiments presented by way of example, a SoC for reducing leakage current and a method of operating the same are provided.

While illustrative and non-limiting embodiments have been shown and described above, it will be apparent to those of ordinary skill in the pertinent art that various modifications and variations may be made without departing from the scope of the present inventive concept as defined by the appended claims.

What is claimed is:

1. A system-on-chip (SoC) comprising:
a processor connected to a plurality of switches connected to a power rail to which an external voltage is applied, the plurality of switches configured to adjust a supply voltage from the power rail to the processor;
a regulator connected between the power rail and a voltage droop detector, and configured to apply a control signal for controlling at least one of the plurality of switches; and the voltage droop detector connected between the regulator and the processor, and configured to transmit a voltage droop detection signal to the regulator when a voltage droop of a voltage, supplied from the power rail to the processor, is detected from the processor,
wherein the regulator turns on a predetermined number of switches, among the plurality of switches, based on the control signal to adjust the supply voltage from the power rail to the processor, when receiving the voltage droop detection signal.

2. The SoC of claim 1, wherein
the voltage droop detector determines that the voltage droop is detected, when the supply voltage drops to a predetermined level or less.

3. The SoC of claim 1, wherein
the voltage droop detector is configured to transmit the voltage droop detection signal to the regulator within a predetermined time.

4. The SoC of claim 1, wherein
the supply voltage is increased as the predetermined number of switches are turned on.

5. The SoC of claim 1, further comprising:
a controller configured to control the regulator to enter or exit a retention state for data retention based on the supply voltage; and
a temperature measurement module connected to the controller and configured to sense temperature data from the processor and transmit the sensed temperature data to the controller.

6. The SoC of claim 5, wherein
the processor exits the retention state as the predetermined number of switches are turned on.

7. The SoC of claim 1, wherein
the processor further comprises a plurality of cores connected to the plurality of switches.

8. The SoC of claim 7,
wherein the regulator turns on the predetermined number of switches when the voltage droop is detected in at least one of the plurality of cores,
wherein the regulator is a low-dropout (LDO) regulator.

9. The SoC of claim 1, wherein
the regulator is a digital low-dropout (DLDO) regulator.

10. A system-on-chip (SoC) comprising:
a processor connected to a plurality of switches that are configured to adjust a supply voltage to the processor;
a temperature measurement module configured to sense temperature data from the processor;
a regulator configured to apply a control signal for controlling at least one of the plurality of switches; and
a controller configured to control the regulator so that the processor enters a retention state for data retention based on the supply voltage when a first condition associated with the temperature data is satisfied, and to control the regulator so that the processor exits the retention state when a second condition associated with the control signal is satisfied;
wherein the controller comprises:
a regulator controller configured to output an operation signal for controlling the regulator to the regulator; and
a power controller configured to control the regulator controller,
the regulator controller outputs an acknowledge signal to the power controller when the first condition is satisfied, and
the power controller controls the regulator controller to output the operation signal when receiving the acknowledge signal.

11. The SoC of claim 10, wherein
the first condition is defined as whether the temperature
data satisfies a predetermined temperature value or less.

12. The SoC of claim 10, wherein
the second condition is defined as whether the number of
at least one switch whose turn-on is instructed by a
control signal satisfies a predetermined number or
more.

13. The SoC of claim 10, wherein
the controller is configured to receive the control signal
from the regulator.

14. A method of operating a system-on-chip (SoC), the
method comprising:
sensing temperature data of a processor included in the
SoC;
outputting from a regulator controller an acknowledge
signal to a power controller when a first condition
associated with the temperature data is satisfied;
controlling the regulator controller, by the power control-
ler when receiving the acknowledge signal, to output an
operation signal to a regulator connected between the
regulator controller and a plurality of switches;
entering a retention state for data retention based on a
supply voltage of the processor, in responsive to a
control signal generated by the regulator according to
the operation signal; and exiting the retention state when a second condition asso-
ciated with the plurality of switches configured to
adjust the supply voltage is satisfied;
wherein the processor is connected to the plurality of
switches connected to a power rail to which an external
voltage is applied.

15. The method of claim 14, wherein
the first condition is defined as whether the temperature
data satisfies a predetermined temperature value or less,
and
the second condition is defined as whether the number of
at least one of the plurality of switches satisfies a
predetermined number or more.

16. The method of claim 14, further comprising:
detecting a voltage droop from the processor; and
turning on a predetermined number of switches, among
the plurality of switches, when the voltage droop is
detected.

17. The method of claim 16, wherein
the voltage droop is detected when the supply voltage
drops to a predetermined voltage level or less.

18. The method of claim 14, further comprising:
suspending entry into the retention state when the first
condition is not satisfied.

* * * * *